INVENTOR.
QUENTIN A. KERNS

INVENTOR.
QUENTIN A. KERNS

United States Patent Office 3,484,689
Patented Dec. 16, 1969

3,484,689
ANALYSIS OF NONREPETITIVE PULSE WAVEFORMS BY SELECTION AND STORAGE OF PULSE INCREMENTS
Quentin A. Kerns, Orinda, Calif., assignor to the United States of America as represented by the United States Atomic Energy Commission
Filed Nov. 29, 1966, Ser. No. 597,809
Int. Cl. G01r 19/00, 27/28, 23/00
U.S. Cl. 324—102                                           6 Claims

ABSTRACT OF THE DISCLOSURE

This invention is a sampling circuit for obtaining the waveform of a very fast, non-repetitive input pulse. In the circuit many steady state signals are simultaneously derived and temporarily stored, the amplitude of each signal corresponding to the amplitude of a sampled point along the input signal. The signals may be applied in sequence to an oscilloscope to recreate the waveform of the original signal or can be represented in digital form and applied to a computer.

---

Figure 1A:
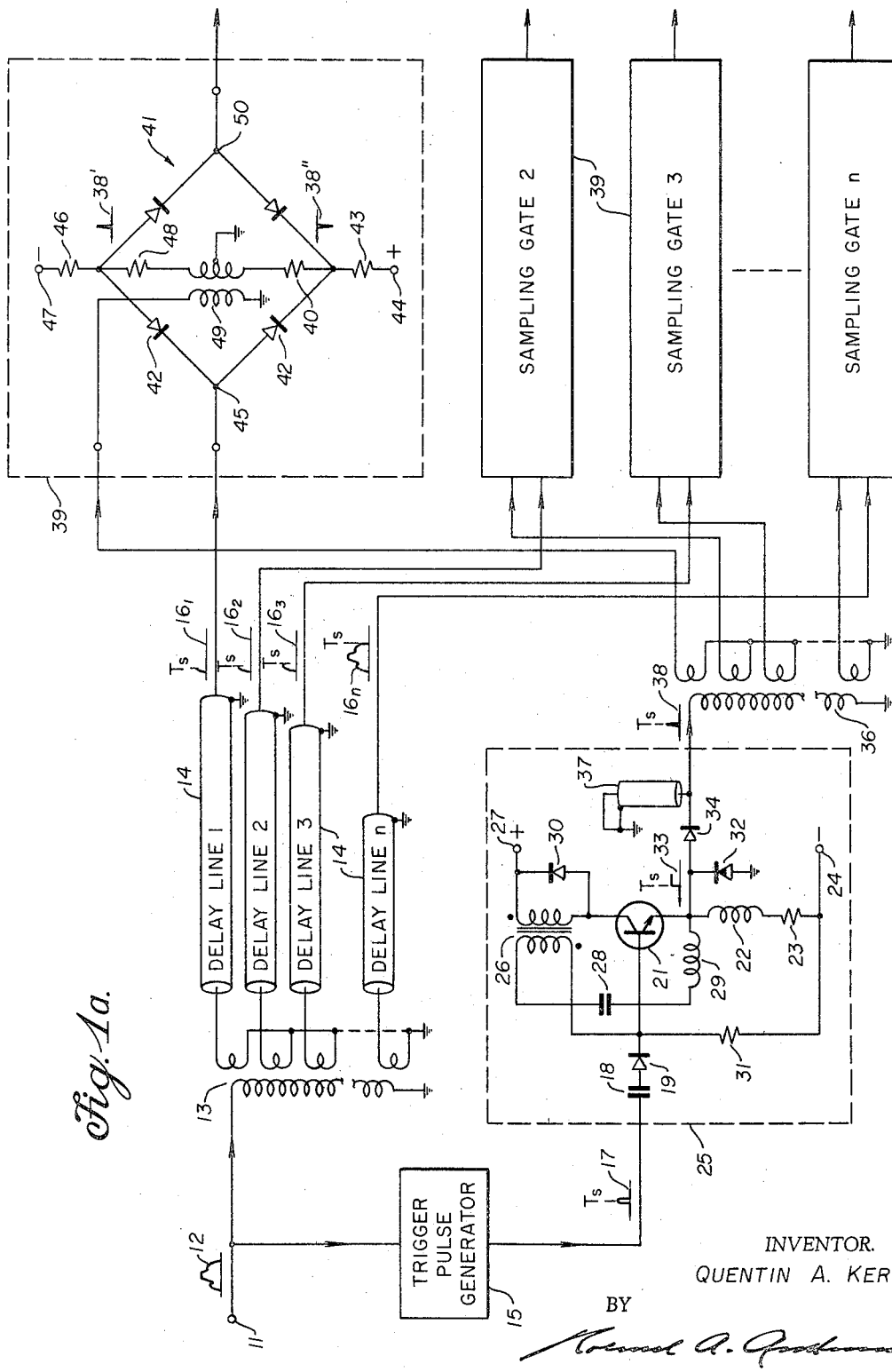

The present invention relates generally to electronic circuitry and more particularly to a sampling circuit for determining the waveform of very fast, non-repetitive input signals. The invention described herein was made in the course of, or under, Contract W–7405–eng–48 with the Atomic Energy Commission.

At present, sampling circuits are generally used with oscilloscopes. While the present invention is also useful in oscillography, it is expected that the invention will be even more useful for digitizing the waveform of an input signal so that computers can accept waveform information.

When the waveform of a very fast signal is to be displayed on the oscilloscope screen, it is advantageous to utilize sampling techniques wherein several samples are taken of the amplitude of short segments of an input signal. In the conventional sampling oscilloscope, portions of the input signal are taken during successive cycles of the signal until many incremental samples along the waveform of the entire input signal are obtained. These samples are then sequentially displayed on the screen of the oscilloscope, thereby reproducing the waveform of the input signal. As opposed to a direct display of the signal on an oscilloscope screen, for very fast signals the sampling technique provides for a signal display with less frequency distortion and with higher amplification. However, these advantages have not been realized for very fast single, transient pulses, since heretofore it has been impossible to apply the conventional sampling technique to the case of the single pulse, as only one sample is taken in a single occurrence of an input signal.

By contrast, the present invention is a sampling means that can display a transient signal, that is, a signal that occurs only once. It is unnecessary to have a train or succession of similar pulses in order to obtain the waveform; a single pulse is sufficient, and succeeding pulses need not resemble the first pulse. Each arriving pulse is treated separately. In the invention, a simultaneous set of samples is taken in incremental portions of the transient input signal and stored, either temporarily or permanently, for subsequent display in sequence on a conventional oscilloscope. In one embodiment of the invention, the input signal to be observed is split into as many channels as the number of samples required and is applied to the input ends of a plurality of transmission lines. The lengths of the lines differ by increments which determine phase differences in the signal at the output ends of the lines.

The samples are taken simultaneously at the output ends of the lines and, since the lengths of the lines are all different, the phase of the signals at the output ends of the lines are all different at the moment of sampling.

The samples are stored and applied in sequence to a conventional oscilloscope as desired to obtain a reconstituted image of the original waveform, or if desired, the samples may be applied to a computer in digital form for computation, control operations, or the like.

It is an object of the present invention to provide a means for sampling a very rapid non-repetitive transient signal.

It is another object of the present invention to provide a circuit in which the information gathering rate is extremely high.

It is another object of the present invention to provide a sampling circuit in which sampling signals are provided in a form suitable for entry into a computer.

It is another object of the present invention to provide a sampling circuit in which the waveform of an input signal may be readily determined for display on an oscilloscope or the like.

Figure 1B:
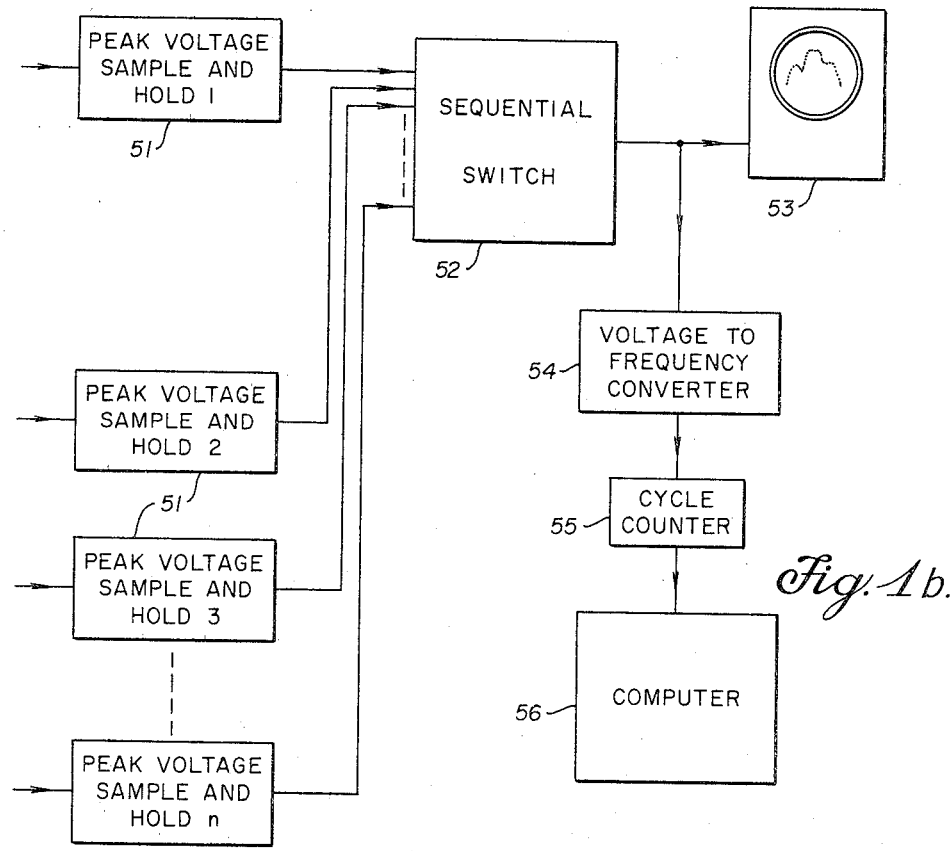
Figure 2:
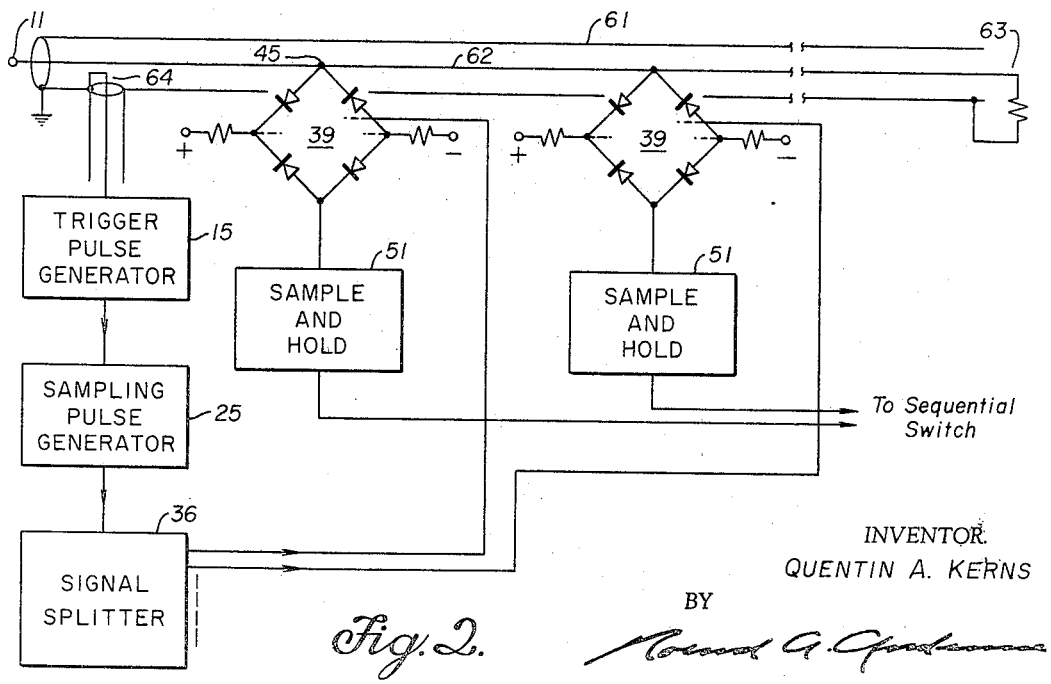

The invention, together with further objects and advantages thereof, will be best understood by reference to the accompanying drawing of which:

FIGURES 1a and 1b are circuit diagrams of one embodiment of the sampling circuit, and FIGURE 2 is a circuit diagram of an embodiment of the invention in which a different means is used for shifting the relative phase of input signals.

Referring now to FIGURE 1a, there is shown an input terminal 11 for receiving a very fast transient signal to be sampled. The waveform 12 of a typical input signal is shown, the signal being applied to the input of a signal-splitting or dividing means 13 such as a transformer having as many secondary windings as there are samples to be taken. While the spliting means 13 is shown symbolically as a conventional transformer, for very fast input signals a tapered transmission line type signal splitter would generally be preferred over a conventional type transformer. If many samples are to be taken, it may be necessary to connect several transformers in a tree type configuration to obtain the necessary number of input signal divisions. Each secondary winding on the transformer 13 is connected to the input end of one of a plurality of delay lines 14 which are generally in the form of coaxial transmission lines but could be striplines or the like. The length of each of the delay lines 14 differs from the lengths of the other delay lines. Thus, while the input signal 12 is simultaneously applied to the input ends of the delay lines 14, it arrives at the outlet ends at incrementally differing times. If, at a particular instant designated $T_s$, the sampling time, the amplitudes of output signals $16_1, 16_2, 16_3 \ldots 16_n$ are simultaneously sampled, the portions of the outlet signals sampled are all different. At the outlet end of each of the delay lines 14, the phase of the outlet signals $16_1 \ldots_n$ is indicated at time $T_s$, the moment of sampling It is obvious that the sampling period must be at least between one to two orders of magnitude shorter than the duration of the input signal 12. In the present invention a very narrow pulse is generated during which sampling occurs. In practice, a pulse duration of less than 0.1 nanosecond ($0.1 \times 10^{-9}$ second) is desirable. For initiating such pulse, a trigger pulse generator 15, such as a monostable multivibrator, receives an input signal from the input terminal 11 and produces a relatively long turn-on pulse 17 at its output. The turn-on pulse 17 is applied through a coupling capacitor 18 and a diode 19 to the base of a transistor 21 in a blocking oscillator 25. The emitter of the transistor 21 is coupled through an inductance 22 and an emitter resistor 23 to a negative voltage power supply terminal 24. The collector of the transistor 21 is connected through the primary of a blocking oscillator transformer 26 to a positive voltage power supply terminal 27. A protection diode 30 is provided across the primary winding of the blocking oscillator transformer 26 so that a transient high voltage will not damage the transistor 21 when the blocking oscillator 25 is turned off. As in conventional blocking oscillator operation, a positive feedback signal from one side of the secondary winding of the blocking oscillator transformer 26 is applied to the base of the transistor 21, while the other side of the secondary winding is coupled through a capacitor 28 and inductance 29 to the emitter of transistor 21. A bias resistor 31 is connected from the base of transistor 21 to the negative power supply terminal 24 to maintain the transistor in a normally non-conducting condition. The positive trigger pulse 17 causes the non-conducting transistor 21 to start to conduct heavily. A positive feedback pulse is applied to the base of transistor 21 from the secondary winding of the blocking oscillator transformer 26, causing heavy conduction of current through transistor 21.

A step-recovery diode 32 has a cathode connected to the emitter of the transistor 21 and anode connected to ground. The step-recovery diode 32 is equivalent to the charge-storage diode, snap-off diode, Boff diode, or the Varactor. Briefly, such a diode, after being forward biased, will deliver a small charge for a very short time if suddenly back biased. After the stored charge is exhausted, the diode very suddenly exhibits the high impedance normal to a reversed biased diode. Such sudden change in resistivity is utilized to obtain the very fast sampling pulse necessary. The diode 32, which is ordinarily forward biased by the negative potential at terminal 24, is back biased when the transistor 21 starts to conduct. When the transistor 21 first starts to conduct nearly all the transistor current is obtained from the stored charge in the step-recovery diode 32. When the stored charge in diode 32 is suddenly exhausted, the current from the transistor 21 must come from negative power supply terminal 24 and the resultant voltage drop across resistor 23 and inductance 22 creates a positive step potential 33 at the emitter of transistor 21. Such step signal 33 is applied to the primary winding of a signal splitter transformer 36, through a diode 34 which is anode-connected to the emitter of transistor 21. A shorted clipping line 37 is connected to the cathode of diode 34 so that step signal 33 is converted into a very short sampling pulse 38 which has a duration equal to twice the transit time along clipping line 37.

In operation of the invention, it is necessary that the output signal from each of the delay lines 14 be sampled for a very short instant. That is the amplitude of the output signal from each delay line must be determined only during the sampling period $T_s$. For such determination of amplitude, a sampling gate 39 is connected to the output end of each of the delay lines 14. The internal circuitry of one type of sampling gate 39 is shown. A bridge circuit 41 is provided having a diode 42 in each leg thereof with the cathodes of each diode being connected toward a positive voltage terminal 44 through a bias resistor 43. A negative potential is applied to the anode side of the diodes 42 through a bias resistor 46 connected to a negative voltage terminal 47. Positive and negative sampling pulses 38' and 38'' are obtained by applying a sampling pulse 38 from signal splitter 36 to the primary winding of a balancing transformer 49 having a center-tapped secondary winding. The negative and positive pulses 38'' and 38' are applied across bridge 41 by connecting the secondary winding of transformer 49 in series between resistors 40 and 48, between bias resistor 43 and bias resistor 46. Output signals from a delay line 14 are applied at input juncture 45 between a first pair of diodes 42 in the bridge 41 and the output signals from the bridge are taken from an output juncture 50 between the remaining two diodes 42. In operation, balanced negative and positive turn-on sampling pulses 38'' and 38' are applied across the bridge 41, thus permitting feedthrough for an instant of the input signal at input juncture 45 to output juncture 50.

A peak voltage sample-and-hold circuit 51 as shown in FIGURE 1b is connected at the output of each sampling gate 39 of FIGURE 1a, such sample-and-hold circuit being characterized in that the amplitude of a received input signal is maintained as a steady state output potential. A sequential switch 52 receives the steady state output potentials from all the peak voltage sample-and-hold circuits 51 and one at a time couples each potential to the switch output terminal by means of a cycling commutator, which could be either mechanical or electronic means. Thus, the output potential of all the sample-and-hold circuits 51 are individually coupled to the output of switch 52 in sequence.

A conventional cathode-ray oscilloscope 53 has a vertical deflection amplifier coupled to the output of the sequential switch and displays the waveform of the input signal 12 as a series of closely connected points or lines. Such waveform on the oscilloscope 53 screen can be observed as a repeating waveform over a prolonged time period by cycling the commutator in the sequential switch over the same time base period as the horizontal deflection frequency used in the oscilloscope.

While the circuit is useful in oscillography, the sampling information can also be utilized in other ways. It is expected that a principal use of the invention will be to supply information to a computer. For such usage, a voltage-to-frequency converter 54 is connected to the output of sequential switch 52, such converter characteristically providing an output signal having a frequency proportional to the amplitude of the signal received from the sequential switch 52. Since each of the input signals applied to switch 52 is ordinarily switched through to the output thereof for equal periods of time, a count of the number of cycles obtained from the voltage-to-frequency converter 54 in a cycle counter 55 provides a digitized representation of the amplitude of each sampling of an input signal. The resultant count for each sampling is applied to a computer 56 as a number which can then store the input signal 12 in digital form. Various operations then can be performed on the information so obtained, for instance, obtaining the area under the waveform, combining various waveforms, or the like.

The computer 56 could also be utilized to provide various control functions over the source of an input signal in response to an analysis of the waveform of such signals. The ability to sample a single transient cuts down time delay, which enters into the fundamental equation for closed-loop control. With the single-transient sampling circuit, all necessary information is obtained immediately from a single pulse, digitized and fed to the computer as a number matrix, with an unlimited number of sampling points. In contrast, in a conventional sampling circuit a succession of many repeating pulses are required and a final resultant cannot be obtained until as many pulses occur as there are sampling points desired. Thus, the single-transient sampling circuit of the present invention becomes more and more advantageous in information-gathering speed as the desired number of sampling points increases. For example, the single-transient sampling circuit can secure 100 sample points almost simultaneously for a single pulse, as opposed to waiting for the occurrence of 100 separate pulses in conventional sampling circuits, which process would take 100 times as long.

In another example of possible usage of the invention, assume that samples are taken of an input signal at one nanosecond intervals over a period of several nanoseconds. The commutator in sequential switch 52 contacts each stored number in turn to produce the output pulses as a succession of closely-spaced voltage values. If the commutator advances more slowly than 1 nanosecond from point-to-point, the resulting output pulse is a time-dilated version of the original. If the commutator advances more rapidly than 1 nanosecond from point-to-point, the resulting output pulse is a shorter version of the original. Since the sampled information is held until one desires to erase it, the output pulse can be displayed or used repetitively on a time basis equal to, shorter than, or longer than the original. The familiar radio technique of heterodyning accomplishes frequency translation up or down for a signal, but only for a sine-wave; the single-transient sampling circuit can alter the signal time base while preserving detail in the signal waveform and therefore represents a form of wide-band heterodyning, applicable to communications and radar systems. Also, the single-transient sampling circuit can be used to solve another communication problem wherein a single, nanosecond transient pulse can be converted into a longer pulse for transmission over phone lines or other standard communication channels which would not transmit the pulse directly. As a further variation, the time-scale of the transient can be reversed, a process that facilitates handling, in some cases. For example, a fast-rising, slow-decay pulse can be reversed by running the output commutator backward. Or, selected portions of the pulse can be stretched or compressed by running the output commutator at a programmed rate that differs for different parts of the pulse.

It should be noted that the invention obtains the samplings of an input signal by providing for a differing phase relationship between the input signal and the sampling pulse at each sampling gate 39. Such phase difference can be obtained in various ways, for instance, in FIGURE 2 another delay means is shown for sampling the input signal. In FIGURE 2, a coaxial transmission line 61 is shown having the center conductor 62 connected to input terminal 11 at one end and terminating by a resistance 63 equal to the characteristic line impedance at the opposite end. Any transmission system in which the input signals follow the TEM mode could be substituted for coaxial line 61. The trigger pulse generator 15 receives input trigger signals through a pick-up loop 64 disposed near the input end of the line 61. A plurality of sampling gates 39, identical to those described with regard to FIGURE 1, have input terminals 45 connected at intervals along center conductor 62.

In operation, sampling pulses from pulse generator 25 are simultaneously applied through signal splitter 36 to each of the sampling gates 39 to sample the particular segment of the input signal which exists at that instant at each of the input terminals 45. The sampling points along an input signal are determined by the distance between input terminals 45 and the velocity of wave propagation down the line 61. It can be seen that the delay means of FIGURES 1 and 2 are similar in that both depend upon varying lengths of transmission line to obtain the desired delay times. In the circuit of FIGURE 2, care in construction must be used to avoid reflecting an input signal at the gate circuit input terminals 45.

To avoid confusing detail, only basic versions of the sampling circuit are shown and described in FIGURES 1 and 2, however, it should be noted that more convenient operation of the sampling circuit is obtainable if various control functions are added. For instance, an erase control signal could be provided for the sample-and-hold circuits 51 to prepare for subsequent sampling operations. The sweep frequency of the oscilloscope 53 could be automatically synchronized with the cycling frequency of the sequential switch 52. The computer 56 could be programmed to automatically control the increments of time delay (by switching in different lengths of transmission line) to compensate for the expected duration of an anticipated input signal. This is particularly appropriate when sampling signals from several different sources in turn.

While the invention has been described with respect to particular embodiments thereof, it is possible to substitute alternate circuits which will, for example, provide the equivalent functions of the sampling gate 39 or the blocking oscillator 25. As another example, it is possible to incrementally delay the sampling pulse 38 instead of the input signal 12 to cause the sampling pulse to arrive at the sampling gates 39 at incrementally varying times and thereby sample various portions of the input signal. As another alternative, both the sampling pulse 38 and input signal 12 could be provided with delays which combine to produce the necessary phase relationships. Furthermore, the output circuit may be varied substantially according to the form in which the output information is desired. It would be possible to eliminate much of the read-out circuitry and simply store the output signals from the sampling gates 39. The stored values could then be read and manually or otherwise plotted on graph paper to obtain the waveform of the input signal. The trigger pulse generator 15 could be actuated by means other than the input signal 12, for instance, in many situations additional signals are produced which have a fixed time relationship with an input signal 12 and could be used to actuate generator 15. Therefore, it will be apparent to those skilled in the art that numerous modifications are possible within the spirit and scope of the invention and thus it is not intended to limit the invention except as defined by the following claims.

What is claimed is:

1. In a sampling circuit for determining the wave form of an input signal from a source, the combination comprising:
    (a) a first signal divider of the class directing input signals from said source into a plurality of parallel output channels,
    (b) a sampling signal generator responsive to said input signal for generating a sampling pulse,
    (c) a second signal divider directing said sampling pulse from said sampling generator into a plurality of parallel output channels,
    (d) a plurality of sampling gates each operable for passing one signal increment of a plurality of signal increments of successive signal phases of said input signal from an input terminal thereof to an output terminal thereof only when said sampling pulse is applied at a gate control terminal thereof, said sampling pulse being applied simultaneously to the control terminals of said plurality of gates, said input terminal of each of said gates being coupled to one of said channels of said first signal divider, said gate control terminal of each of said gates being coupled to one of said channels of said second signal divider,
    (e) plural parallel delay lines of different lengths providing a preselected phase relationship between the signal applied to the input terminal of each of said sampling gates and the sampling pulse applied to the respective gate control terminal thereof, the phase relationship associated with each of said sampling gates being different relative to each other, said delay means being operable for simultaneously applying said increments of said input signal to said gates during the period of said sampling pulse,
    (f) a plurality of storage means for simultaneosuly storing the signal increments passed through said sampling gates, and
    (g) means for sequentially reading out the stored signal increments in said storage means.

2. A sampling circuit as described in claim 1 further characterized in that a pulse trigger generator is provided having an input terminal connected to said source, said sampling signal generator receiving input trigger pulses from said pulse generator whereby a sampling pulse is generated.

3. A sampling circuit as described in claim 2 wherein said sampling signal generator has a step-recovery diode therein, means normally applying a forward bias across said diode, means applying a reverse bias across said diode upon receipt of a trigger pulse from said trigger pulse generator whereby a step potential change is developed across said diode, a pulse clipping line having an input coupled across said diode whereby said step potential is converted to a pulse.

4. A sampling circuit as described in claim 1 wherein said reading-out means has a sequential switch with a plurality of input terminals each connected to one of said storing means and adapted to receive stored information thereform, said switch being of the class successively coupling each one of said input terminals to an output terminal thereof, and a cathode-ray oscilloscope having a set of deflection plates coupled to said output terminal of said sequential switch.

5. A sampling circuit as described in claim 1 wherein said reading-out means has a sequential switch with a plurality of input terminals and an output terminal and of the class having a commutator connectable from said output terminal to said input terminals in succession, each of said input terminals of said switch being connected to receive signals stored in one of said storing means, a voltage-to-frequency converter coupled to the output terminal of said switch and of the class generating an output signal with a frequency dependent upon the amplitude of an input signal, means counting the cycles in output signals from said converter during equal time intervals for each commutator connection of said switch.

6. A sampling circuit as described in claim 5 further characterized in that a computer is provided for processing output signals from said counting means.

References Cited

UNITED STATES PATENTS

| | | | |
|---|---|---|---|
| 3,278,846 | 10/1966 | Patten et al. | 324—77 |
| 2,403,561 | 7/1946 | Smith | 328—152 XR |
| 2,810,828 | 10/1957 | Gray et al. | 328—153 XR |
| 2,844,652 | 7/1958 | Pinet | 328—153 XR |
| 2,951,988 | 9/1960 | Harlan et al. | 328—153 XR |
| 3,069,559 | 12/1962 | Chaplin et al. | 328—186 XR |
| 3,105,197 | 9/1963 | Aiken | 328—151 XR |
| 3,133,254 | 5/1964 | Lindsay et al. | 328—151 XR |
| 3,364,466 | 1/1968 | Stine | 328—151 XR |
| 3,064,193 | 11/1962 | Grubb et al. | 324—120 |
| 3,189,820 | 6/1965 | Lowman | 324—82 |

RUDOLPH V. ROLINEC, Primary Examiner

ERNEST F. KARLSEN, Assistant Examiner

U.S. Cl. X.R.

324—77; 328—151